(12) United States Patent
Hoff

(10) Patent No.: US 6,294,091 B1
(45) Date of Patent: Sep. 25, 2001

(54) SUBMERSIBLE CENTRIFUGE APPARATUS

(75) Inventor: William D. Hoff, Newport Beach, CA (US)

(73) Assignee: Alpha Omega Centrifuge Inc., Costa Mesa, CA (US)

(*) Notice: Subject to any disclaimer, the term of this patent is extended or adjusted under 35 U.S.C. 154(b) by 0 days.

(21) Appl. No.: 09/478,142

(22) Filed: Jan. 5, 2000

(51) Int. Cl.[7] ................................................ B01D 21/26
(52) U.S. Cl. ..................... 210/380.1; 210/360.1; 210/295; 494/36
(58) Field of Search .............. 210/360.1, 380.1, 210/295; 494/36

(56) References Cited

U.S. PATENT DOCUMENTS

| | | |
|---|---|---|
| 4,557,831 | 12/1985 | Lindsay . |
| 4,871,458 | 10/1989 | Purvey . |
| 5,096,581 | 3/1992 | Purvey . |
| 5,656,164 * | 8/1997 | Vado et al. ............. 210/380.1 |

* cited by examiner

Primary Examiner—David A. Reifsnyder
(74) Attorney, Agent, or Firm—William W. Haefliger

(57) ABSTRACT

A centrifuge, comprising in combination a motor driven shaft, a fluid centrifuging chamber carried by the shaft, to rotate therewith, first porting extending endwise in the shaft and opening to said chamber, to deliver fluid to be centrifuged to the chamber, a matrix in the chamber and into which contaminate in the fluid is centrifuged for compaction and separation from the fluid, during chamber high speed rotation, second porting extending endwise in the shaft and communicating with the chamber, to receive fluid from which contaminate has been separated, fluid delivering inlet structure communicating with said first porting, and fluid outlet structure communicating with the second porting. The shaft and centrifuging chamber are assembled via a flange on the shaft that closes the end of the centrifuging chamber.

23 Claims, 4 Drawing Sheets

SUBMERSIBLE CENTRIFUGE APPARATUS

BACKGROUND OF THE INVENTION

This invention relates generally to centrifuging of fluids to separate solid contaminate from such fluids; and more particularly concerns highly effective and efficient submersible centrifuging apparatus operating at very high rates of rotation, and methods of operation.

There is continual need for more efficient, reliable, simple and effective centrifuging equipment, and capable of removing micron size particulate from fluids such as aircraft fuel and hydraulic fluids. The present invention provides apparatus and methods that meet such needs.

SUMMARY OF THE INVENTION

It is a major object of the invention to provide improved centrifuging apparatus that comprises, in combination:

a) a motor driven shaft, b) a fluid centrifuging chamber carried by the shaft, to rotate therewith, c) first porting extending endwise in the shaft and opening to said chamber, to deliver fluid to be centrifuged to the chamber, d) a matrix in the chamber and into which contaminate in the fluid is centrifuged for compaction and separation from the fluid, during chamber high speed rotation, e) second porting extending endwise in the shaft and communicating with the chamber, to receive fluid from which contaminate has been separated, f) fluid delivery inlet structure communicating with the first porting, and fluid outlet structure communicating with the second porting.

It is another object of the invention to provide a highly effective shaft configuration, wherein the shaft end contains terminal portions of the first and second porting, the first porting typically including multiple elongated first ducts extending endwise in the shaft, and the second porting including multiple elongated second ducts also extending endwise in the shaft. For most effective and balanced operation, and cooling, the first and second ducts extend in alternating relation, about the shaft axis.

A further object is to provide such second porting or ducts to have fluid entrance or entrances at the shaft periphery to communicate with the centrifuging chamber, and to receive centrifuged fluid therefrom. Also, the first porting or ducts typically have an outlet or outlets at the shaft periphery, in axially spaced relation from the second porting entrances, to deliver fluid to be centrifuged to the chamber.

Yet another object is to provide the matrix with multiple interstices less than 1 micron in cross dimension. The matrix may have the form of a mesh located proximate the radially outermost extent of the chamber; and it may advantageously be incorporated in a replaceable cartridge form, axially insertible into and removable from the centrifuging chamber.

A further object is to locate the centrifuging apparatus in aircraft structure, as for example in a fuel tank in the aircraft wing, the apparatus capable of mounting location at any angular position relative to the wing.

As will appear, the centrifuging apparatus may be electric motor driven at rotation rates typically in excess of 20,000 RPM.

These and other objects and advantages of the invention, as well as the details of an illustrative embodiment, will be more fully understood from the following specification and drawings, in which:

DRAWING DESCRIPTION

DETAILED DESCRIPTION

Figure 1:
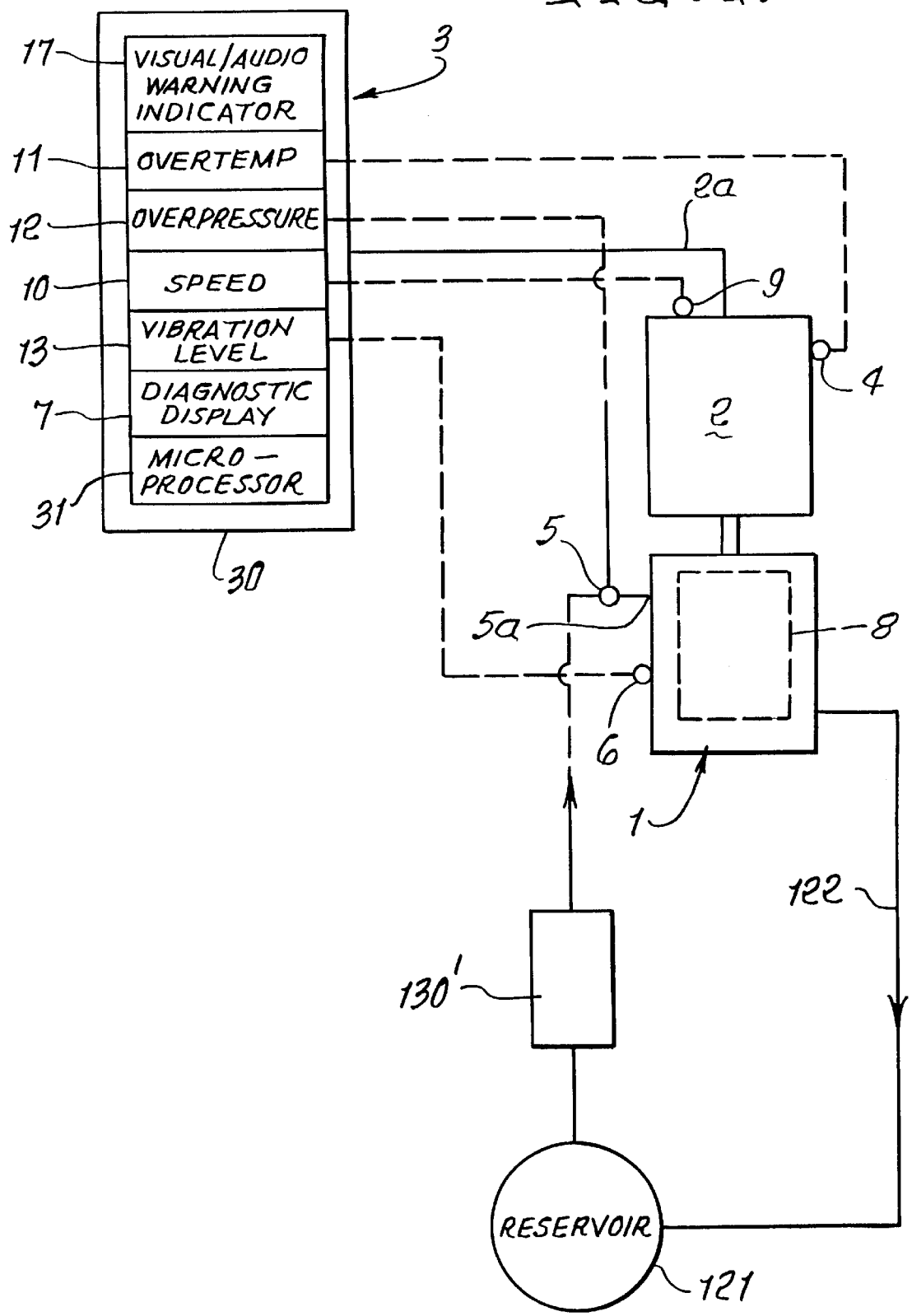
FIG. 1 is a schematic representation of the electric motor driven centrifuging filter system according to a preferred embodiment of the present invention.

With reference to FIG. 1, there is shown a centrifugal filter system which includes a centrifugal filter assembly 1, an electric drive motor 2, power electronics 3 that enable the speed of the centrifuge to be varied, temperature sensors 4 located at the motor and optionally at other strategic locations in the system, pressure transducer 5 that monitors the inlet pressure of the fluid at the inlet 5a to the centrifugal filter assembly, and an accelerometer 6 mounted on the centrifugal filter assembly housing to detect the vibration level of the rotating drum indicated at 8.

A speed sensor 9 located inside the motor housing enables the motor speed and hence the speed of the spinning centrifuging chamber to be determined. The signal outputs from the speed sensor, temperature sensor, pressure transducer and accelerometer are transmitted to 3 and displayed as digital readouts 10, 11, 12 and 13 on the power electronics box 30. In the event of an abnormal condition, such as a higher than normal vibration level or inlet pressure, the system will control the motor 2, via control line 2a to automatically slow the rotating centrifuge, in accordance with pre-programmed logic coded in a microprocessor 31 housed in the power electronic box, until the condition returns to normal. Additionally, a visual or audio warning indicator 17 can be incorporated in the electronics box. At the same time, an error code is stored in the system which can be later retrieved for trouble shooting.

In the event that the conditions as indicated by the sensors and transducers represent unsafe operating conditions, the system will automatically be shut down and will display an error code in the diagnostic display 7. The diagnostic display incorporates a built-in test feature such as a circuit that assesses the condition of the sensors and the power electronics on initial power up, and informs the operator if one or more of the sensors is or are not operational.

Liquid to be centrifuged may be supplied from 130', and returned to reservoir 121, via line 122. A liquid use outlet is indicated at 122.

Figure 2:
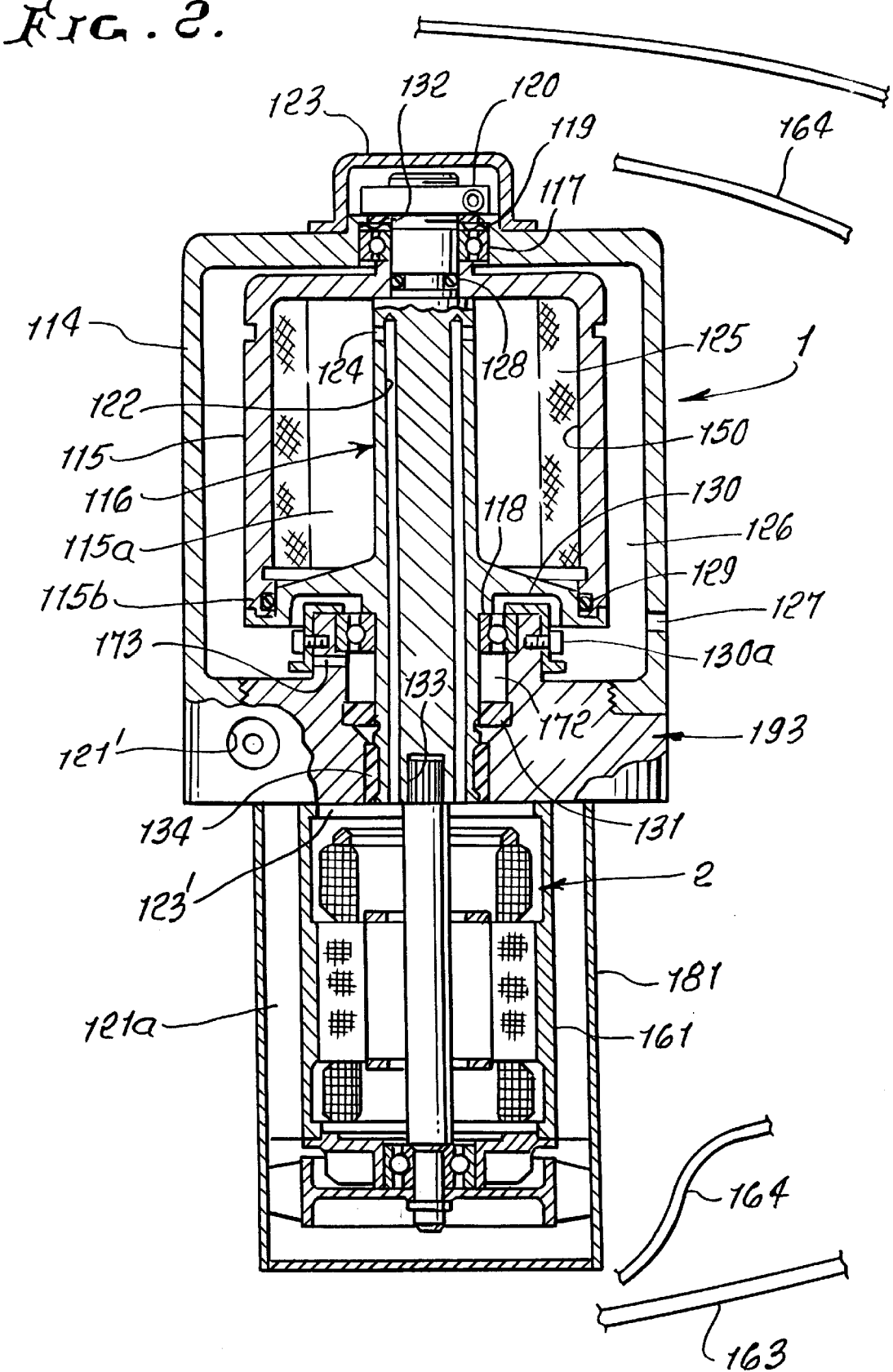
FIG. 2 is a sectional view of the centrifuging filter assembly, according to the present invention.
Figure 3:
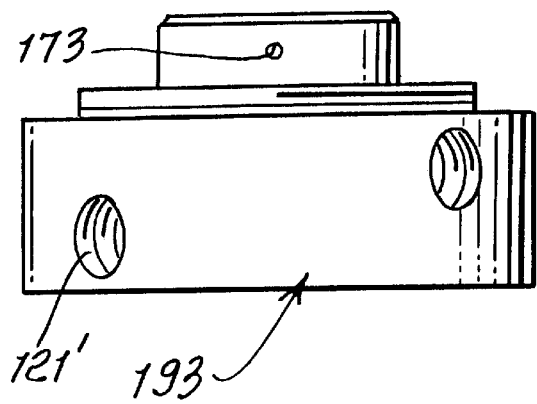
FIG. 3 is an external view of a body cap.

FIG. 2 shows a sectional view of the centrifugal filter assembly 1 according to the present invention. The filter assembly includes an outer housing 114, a turbine drum or centrifuging chamber 115, and a turbine spindle or shaft 116. The turbine spindle is supported by front and rear ball bearings 117 and 118, respectively. The rear bearing is axially preloaded with a wave spring 119. A bearing lock nut 120 is used to clamp the rotary turbine drum to the rotary spindle. Cap 123 covers 120 and is attached to 114. See also bearing 118 retainer 130 attached at 130a to 193.

The flow of fluid is introduced to the filter assembly as by an external fluid pump at 130', seen in FIG. 1. No preheating of the fluid is required. The fluid is introduced to the filter assembly via an external fluid port 121' from which fluid passes via inlet flow passages 121a to the inlet transfer chamber 123'. Fluid is supplied via elongated ports 122 in shaft 116 to outlet ports 124 opening to interior 115a of cylindrical chamber 115, co-axial with shaft 116. The high centrifugal force created by spinning of the chamber or drum, for example at speed in excess of 20,000 RPM and preferably about 24,000 RPM, forces the contaminants toward the inner surface 150 of the drum, where they are captured in an axially cascading contaminant matrix type trap 125, forming interstices of cross dimension less than 1 micron.

Figure 4:
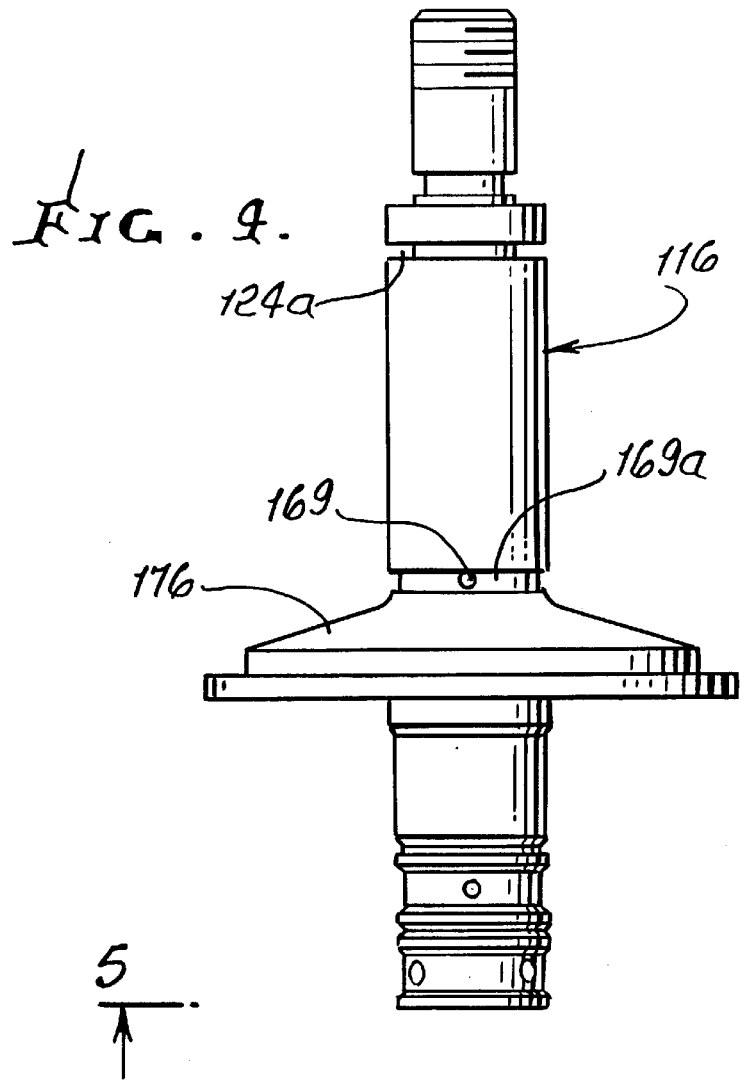
FIG. 4 is an external elevational view of a rotary shaft and integral carrier for a centrifuging chamber.
Figure 5:
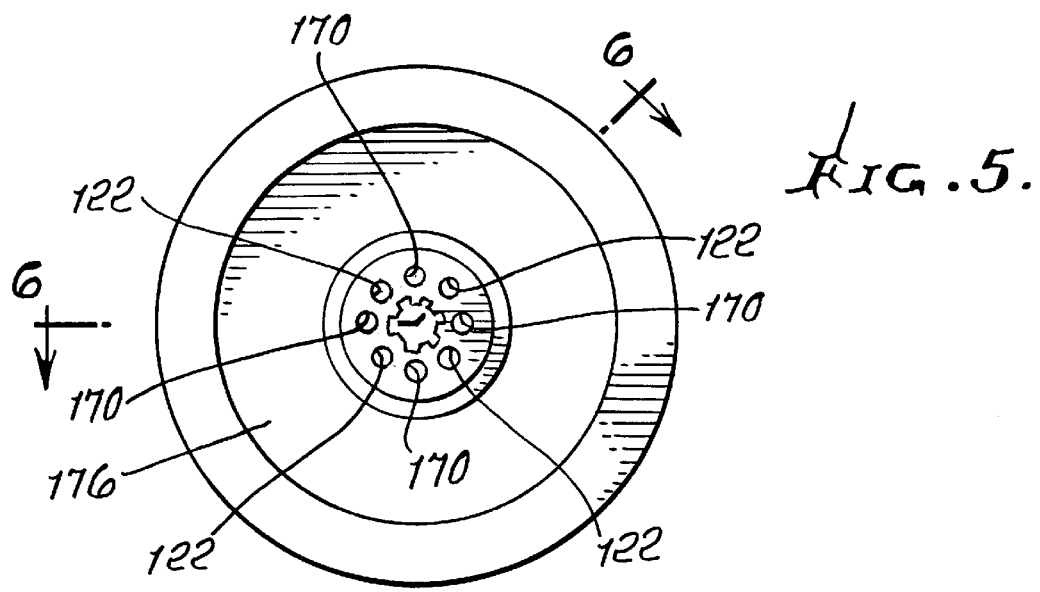
FIG. 5 is an end view taken on lines 5—5 of FIG. 4.
Figure 6:
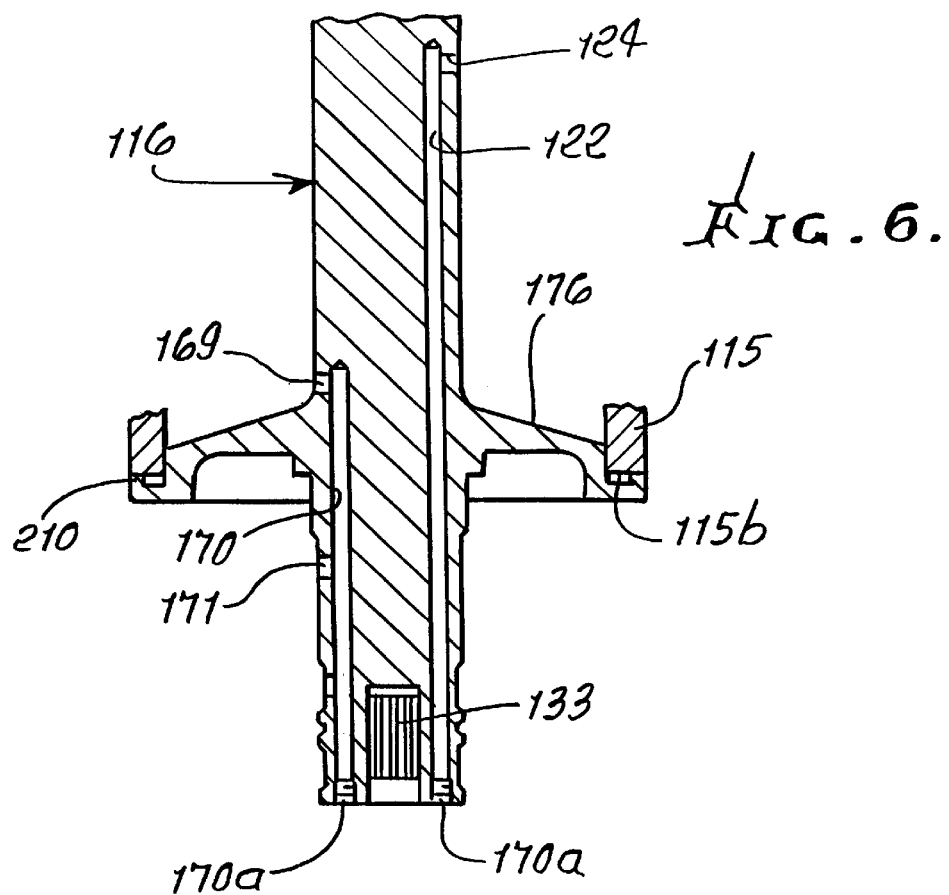
FIG. 6 is an axial sectional view taken through rotary shaft, showing the inlet and discharge openings that communicate with the interior of the centrifuging chamber, according to the preferred embodiment of the present invention.

The cleaned fluid enters axially elongated ports or passages 170 via entrances 169, for flow via side ports 171, and passages 172 and 173 (in body cap 193) into the return transfer chamber 126. There is one entrance 169 and one side port 171, for each passage 170. Chamber 126 returns the fluid to an external port 127. Multiple such equal length return passages 170 or ducts are provided in the spindle and are clocked or angularly positioned about the spindle axis in alternating relation with equal length ports or ducts 122', for balance. See FIG. 5. End plugs appear at 170a. Ring shaped manifolds 169a and 124a may be provided as seen in FIG. 4 to intersect the ports 169 and 124, for flow balance. The spindle or shaft carries an enlarged flange 176 that supports the end 115b of the drum 115, for axial removability, and that serves as an end closure for the chamber, for simplicity. The shaft and porting 122 and 170 project through the flange, and toward 170a.

The contaminant trap 125 is preferably comprised of a separate disposable cartridge which is inserted axially endwise into the interior of the drum or chamber 115 prior to assembly of the chamber onto flange 176, to form the complete rotating assembly. O-ring seals 128 and 129 are used to prevent leakage of the oil from the inside of the drum to the exterior. A Teflon slip ring seal 131 is carried by 193 and used to separate the inlet 123 and exit transfer 172 chambers. A lip seal 132 prevents the front bearing 117 from being contaminated. A second lip seal 134 provides a sealing surface between the drive shaft and the inlet transfer chamber 123 at the end of the drive motor. A female spline 133 on the spindle shaft 116 allows the centrifugal filter assembly to be coupled to the drive motor which is housed in a separate housing 181. A spacer 210 can be used in the chamber 115 to seat on 176 and to axially position the chamber 115 as well as matrix 125.

The motor 2 is preferably cooled by flowing the fluid over a jacketed motor housing 161. Unlike prior centrifuge designs, the present apparatus can be operated at any altitude and angular attitude, as within an aircraft wing, indicated at 163. It can also be operated while totally immersing the unit in a fluid reservoir such as an aircraft wing tank 164 seen in FIG. 2.

Further unusual advantages are as follows:

High speed centrifuges in accordance with the invention can operate at in excess of 20,000 RPM's, and create 19,000 G-Forces on the oils of fluids being cleaned. This allows removal of even lightweight, sub-micronic particles (below $1/10^{th}$ of a micron), and thereby reaching nearly particle-free counts (I.E./40 gallon system=I.S.O. as low as 5/2!).

Full-flow or bypass installation is possible, for all applications, such as in turbine and diesel engines, transmissions, hydraulics systems, and employing fluids such as fuels (diesel and jet), coolants, and aircraft products such as Skydrol (a non-flammable hydraulic fluid).

A six-gallon per minute version has been designed for use on M-1 Turbine engine tanks as well as Diesel types, armored personnel carriers, Caterpillar type heavy equipment aircraft and light Naval vessels.

A 27 gallon per minute filter flow version is suited for: Mobile or stationary reclamation/reuse centers, where it can be used to reduce hazardous waste by processing for re-use; engine oil, turbine oil, transmission oil, hydraulic oil, lubricating oil, machine and cutting oils, anti-freeze type coolants, and even solvents. By removing the contamination particles, and most of the carbon and sulfur by-products, only a small amount of sludge remains to be disposed of, reducing hazardous waste disposal from such devices by up to 99%. At the same time, the recycled products can be reused, and the need for purchase of new products is also reduced.

Matrix 150 may consist of fine metallic strands, randomly oriented, and interconnected to form the interstices.

I claim:

1. A centrifuge, comprising in combination:
   a) a motor driven shaft,
   b) a fluid centrifuging chamber carried by the shaft, to rotate therewith,
   c) first porting extending endwise in the shaft and opening to said chamber, to deliver fluid to be centrifuged to the chamber,
   d) a matrix in the chamber and into which contaminate in the fluid is centrifuged for compaction and separation from the fluid, during chamber high speed rotation,
   e) second porting extending endwise in the shaft and communicating with the chamber, to receive fluid from which contaminate has been separated,
   f) fluid delivering inlet structure communicating with said first porting, and fluid outlet structure communicating with the second porting.

2. The combination of claim 1 including a non-rotating housing receiving said chamber and said shaft.

3. The combination of claim 2 including an aircraft structure in which said housing is carried, for centrifuging of aircraft fuel.

4. The combination of claim 3 wherein said aircraft structure is a wing.

5. The combination of claim 2 including an aircraft wing within which said housing is carried for rotation of said centrifuging chamber to centrifuge liquid fuel.

6. The combination of claim 1 wherein said shaft has an end that contains terminal portions of said first porting.

7. The combination of claim 1 wherein said first porting includes multiple equal length elongated first ducts extending endwise in the shaft, and said second porting including multiple equal length elongated second ducts also extending endwise in the shaft.

8. The combination of claim 7 wherein the shaft has an axis, and the first and second ducts extend in alternating relation, about said axis.

9. The combination of claim 1 wherein said second porting has fluid entrance or entrances at the shaft periphery to communicate with said chamber and receive centrifugal fluid therefrom.

10. The combination of claim 9 wherein said first porting has an outlet or outlets at the shaft periphery.

11. The combination of claim 1 wherein said first porting has an outlet or outlets at the shaft periphery, in axially spaced relation from the second porting to deliver fluid to be centrifuged to the chamber.

12. The combination of claim 1 wherein said matrix forms multiple interstices less than 1 micron in cross dimension.

13. The combination of claim 12 wherein the matrix has the form of a mesh cylinder assembled endwise into said chamber and located proximate the radially outermost interior extent of the chamber.

14. The combination of claim 1 including said fluid in the chamber, and consisting of one of the following:
   i) engine fuel
   ii) hydraulic fluid.

15. The combination of claim 1 including said motor operating to rotate said shaft at over 20,000 revolutions per minute.

16. The combination of claim 1 wherein said matrix is incorporated in a cartridge axially insertible into said centrifuging chamber.

17. The combination of claim 1 including passage structure in communication with said second porting to flow centrifugal fluid in cooling relation with the motor.

18. The combination of claim 1 wherein there is a radially projecting flange on the shaft acting as an end closure for the centrifuging chamber, and which removably supports that chamber.

19. The combination of claim 18 wherein the shaft and said first and second porting project endwise through the flange, away from the interior of said chamber, and toward entrances defined by said first porting.

20. The combination of claim 18 including fluid transfer chambers at the side of said flange opposite said centrifuging chamber.

21. The combination of claim 18 including positioning structure axially positioning the centrifuging chamber and matrix relative to said flange.

22. The combination of claim 18 including a non-rotating housing receiving said chamber and said shaft, and a bearing supporting the shaft proximate said flange, for rotation relative to said housing.

23. The combination of claim 1 including ring shaped flow manifolds sunk in the shaft periphery to intercept multiple exits from said first porting and multiple entrances to said second porting.

* * * * *